United States Patent [19]

Beck, Jr.

[11] Patent Number: 4,694,648
[45] Date of Patent: Sep. 22, 1987

[54] ANTI-PLUG CONTROL

[75] Inventor: Richard Beck, Jr., Ames, Iowa

[73] Assignee: Sundstrand Corporation, Rockford, Ill.

[21] Appl. No.: 714,091

[22] Filed: Mar. 20, 1985

Related U.S. Application Data

[63] Continuation of Ser. No. 449,407, Dec. 13, 1982, abandoned.

[51] Int. Cl.[4] .............................................. F16D 31/02
[52] U.S. Cl. ...................................... 60/452; 60/437; 60/444; 417/213; 417/218
[58] Field of Search ................ 60/443, 444, 445, 450, 60/451, 452, 487, 488, 485, 484; 417/212, 218, 219, 220, 221, 222

[56] References Cited

U.S. PATENT DOCUMENTS

| | | | |
|---|---|---|---|
| 2,996,135 | 8/1961 | Grabow | 60/435 |
| 3,359,727 | 12/1967 | Hann et al. | 60/444 |
| 3,411,297 | 11/1968 | Hann | 60/444 |
| 3,659,963 | 5/1972 | Jennings | 417/212 |
| 3,768,928 | 10/1973 | Miller et al. | 417/222 |
| 3,784,328 | 1/1974 | Pederson | 417/222 |
| 3,890,783 | 6/1975 | Allen et al. | 60/445 |
| 3,995,425 | 12/1976 | Wittren | 60/452 |
| 4,019,404 | 4/1977 | Schauer | 60/437 |
| 4,034,918 | 7/1977 | Culbertson et al. | 60/444 |
| 4,098,144 | 7/1978 | Besel et al. | 60/437 |

FOREIGN PATENT DOCUMENTS

| | | | |
|---|---|---|---|
| 552366 | 12/1956 | Italy | 60/435 |
| 1084683 | 9/1967 | United Kingdom . | |
| 1538740 | 1/1979 | United Kingdom . | |

OTHER PUBLICATIONS

Frank Yeaple, Fluid Power Design Handbook, 1984, p. 109 (FIG. 6.8).

Primary Examiner—A. Michael Chambers
Attorney, Agent, or Firm—Wood, Dalton, Phillips, Mason, & Rowe

[57] ABSTRACT

An anti-plug control for a drive to prevent jamming of a driven working element in response to an overload wherein said drive includes a hydrostatic transmission having a variable displacement unit and a fixed displacement unit connected in closed circuit. A servo control cylinder is connected to a swash plate of the variable displacement unit for causing positioning thereof. A normally closed pressure-responsive valve monitors the pressure in the high pressure side of the closed circuit and is openable when the pressure reaches a predetermined value to deliver fluid from the closed circuit to the servo control cylinder and modify the displacement of the variable displacement unit to increase the speed of the working element to attempt clearing the overloaded condition of the working element.

9 Claims, 2 Drawing Figures

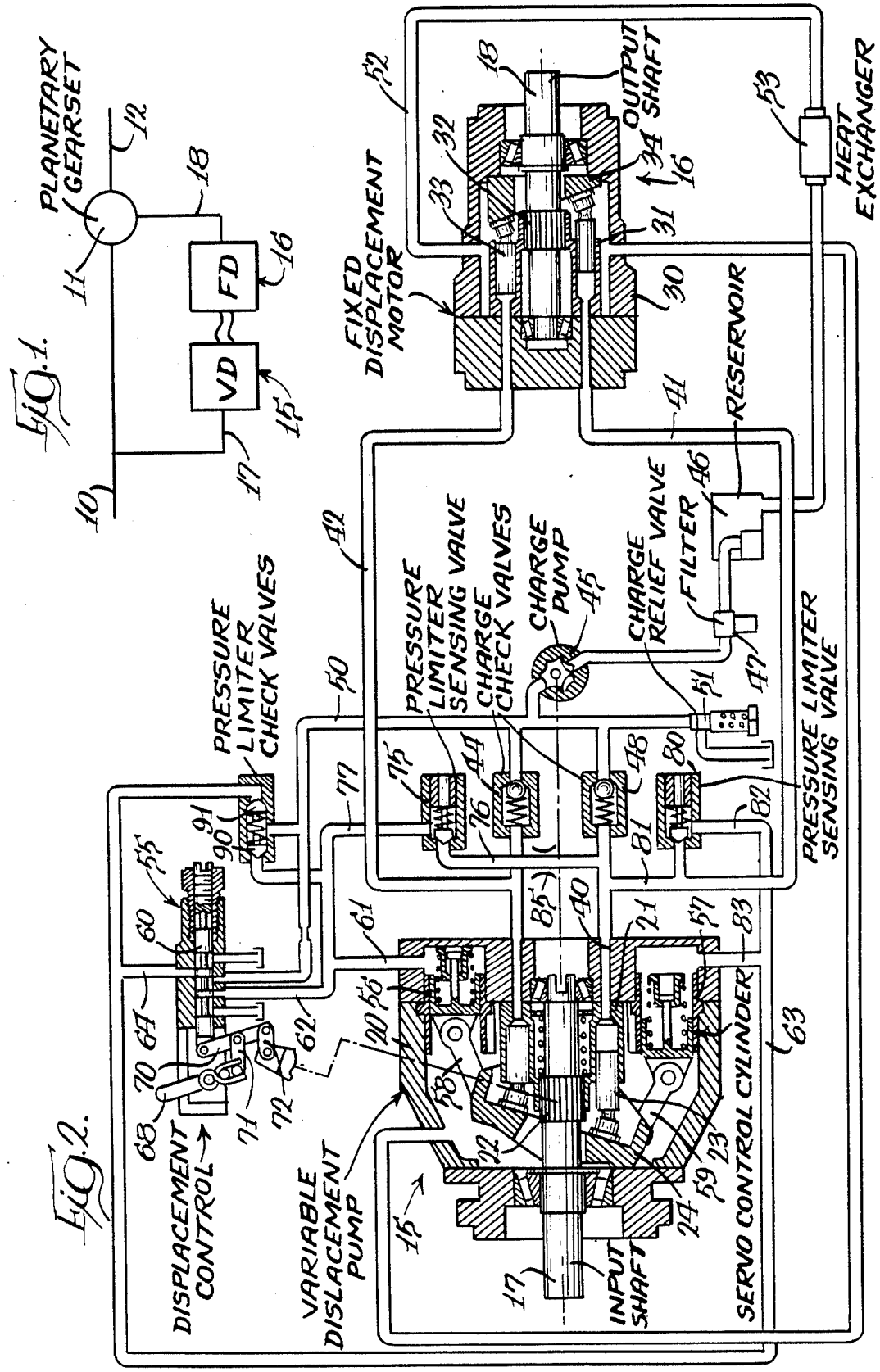

ANTI-PLUG CONTROL

This is a continuation of application Ser. No. 449,407 filed Dec. 13, 1982 now abandoned.

TECHNICAL FIELD

This invention relates to an anti-plug control for a drive which drives a working element, such as the main rotor of a rotary combine harvester that can be jammed by excessive material. More particularly, the invention relates to the control of a variable displacement unit of a hydrostatic transmission used independently as the drive means or as part of a hydromechanical transmission drive means with the change of the displacement of the variable displacement unit upon the occurrence of a jam effecting an increase in the speed of the working element.

BACKGROUND ART

In rotary combine harvesters, there is a driven main rotor to which the crop is fed. The main rotor can be subject to plugging which occurs when the main rotor becomes jammed with crop because the crop is fed thereto in larger quantities than can be passed by the main rotor. The control of this invention senses the pressure in the closed circuit of the hydrostatic transmission and, when the pressure reaches a predetermined value, the control operates to adjust the variable displacement unit of the hydrostatic transmission to increase the speed of the main rotor. It is known in the art to sense the pressure in the closed circuit of a hydrostatic transmission and, at some level of pressure, cause a change in the displacement of the variable displacement unit. However, such a control has been to reduce the torque applied to the motor, rather than cause a change in the speed of the motor of the transmission to increase the speed of the working element driven by the transmission.

DISCLOSURE OF THE INVENTION

The present invention relates to a new and improved anti-plug control for a drive to prevent jamming of a driven working element in response to an overload by varying the displacement of the variable displacement unit of a hydrostatic transmission to increase the speed of the working element. This working element can be the main rotor of a rotary combine harvester or other conveying devices, such as a belt conveyor or an auger, which could be subject to jamming by an excess quantity of material being handled.

A primary feature of the invention is to provide an anti-plug control for a drive utilizing a hydrostatic transmission having a variable displacement unit and fixed displacement unit in closed circuit wherein the pressure in the high pressure side of the closed circuit is monitored and, when the pressure exceeds a predetermined value, the displacement of the variable displacement unit is changed to result in an increase in speed of the working element to clear material from the working element in an effort to prevent jamming thereof.

In carrying out the foregoing, the drive is a hydromechanical transmission, with the hydrostatic transmission being part thereof, with the variable displacement unit having a swash plate and a servo control cylinder connected thereto. A fluid line extends from the high pressure side of the closed circuit to said servo control cylinder and a normally closed pressure-responsive valve in the fluid line opens when said predetermined pressure is reached and causes pressure fluid to act on the servo control cylinder to decrease the displacement of the variable displacement unit, with the result that the speed of the working element is increased.

An object of the invention is to provide an anti-plug control for a drive to prevent jamming of a driven working element in response to an overload wherein the drive includes a fluid motor and a variable displacement fluid pump in closed circuit for supplying fluid to the motor comprising, means for controlling displacement of the pump, means for sensing the pressure of the fluid delivered by the pump to the motor, and means responsive to an increase of said pressure beyond a predetermined value for modifying the displacement of the pump to increase the speed of said drive.

Still another object of the invention is to provide a control as defined in the preceding paragraph including additional means operable in response to an increase in the fluid pressure a predetermined amount beyond said predetermined value for modifying the displacement of the pump to decrease the speed of the drive.

Still another object of the invention is to provide an anti-plug control for a drive of the type described in the preceding paragraphs wherein the hydrostatic transmission is a part of a hydromechanical transmission. The control comprises a fluid line connected between the high pressure side of the closed circuit and a servo control cylinder connected to a movable swash plate of the variable displacement pump, and a normally closed pressure-sensing valve in the fluid line and openable in response to a certain pressure in the high pressure side of the closed circuit to permit fluid pressure from the closed circuit to act on the servo control cylinder and decrease pump displacement to increase the speed of the working element.

BRIEF DESCRIPTION OF THE DRAWINGS

FIG. 1 is a diagrammatic view of a hydromechanical transmission; and

FIG. 2 is a schematic drawing of the hydrostatic components of the transmission.

BEST MODE FOR CARRYING OUT THE INVENTION Out the Invention

FIG. 1 illustrates a conventional hydromechanical transmission wherein a driven input shaft 10 extends to a planetary gear set 11 and a drive shaft 12 extends from the planetary gear set. The planetary gear set typically has a sun gear and a ring gear with intermediate planet gears carried on a planet carrier. A hydrostatic transmission having a variable displacement unit 15 and a fixed displacement unit 16 are connected together in a closed circuit, with the variable displacement unit 15 having an input shaft 17 driven by the input shaft 10 and the fixed displacement unit having an output shaft 18 connected to an element of the planetary gear set. A hydromechanical transmission is shown in the Ross U.S. Pat. No. 3,396,607 and the disclosure thereof is incorporated herein by reference. As evident from the Ross Patent, the input shaft 10 can connect to the planet gear carrier of the planetary gear set and the output shaft 18 of the fixed displacement unit connects to the ring gear and with the drive shaft 12 being connected to the sun gear. In a hydromechanical transmission, the speed of the planetary gear set element driven by the output shaft 18 of the hydrostatic transmission can be either added or subtracted to the rotational speed of the planetary gear set element driven at a constant input speed by the input shaft 10.

With the variable displacement unit 15 at maximum displacement at one side of neutral, the speed of the drive shaft 12 is at a minimum and, as the displacement of the variable displacement unit 15 is decreased, the speed of the drive shaft 12 increases.

The hydrostatic transmission utilized in FIG. 1 is shown more particularly in FIG. 2.

The variable displacement unit 15, identified as a variable displacement pump in FIG. 2, and the fixed displacement unit 16, identified as a fixed displacement motor in FIG. 2, are each constructed as an axial piston unit, with the stroke of the pistons controlled by a swash plate.

The variable displacement pump 15 has a casing 20 which rotatably mounts on bearings the input shaft 17. A cylinder block 21 is rotatable within the casing and is splined at 22 to the input shaft for rotation therewith. A series of pistons 23 are movable in cylinders within the cylinder block and the stroke thereof is controlled by a movable swash plate 24 with shoes carried by the pistons in sliding contact with the swash plate.

The fixed displacement motor 16 has a casing 30 which rotatably mounts the output shaft 18 on bearings and a cylinder block 31 is splined at 32 to the output shaft. The cylinder block 31 has cylinders in each of which a piston 33 is movable with the stroke thereof being controlled by a fixed swash plate 34.

With the pump swash plate 24 positioned as shown in FIG. 2, pistons 23 are stroked for maximum displacement during rotation of the cylinder block and fluid under pressure is delivered from a pump outlet 40 to a fluid line connection 41 extending to the motor 16 and which forms the high pressure side of a closed circuit connecting the pump and motor. The low pressure side of the closed circuit is through a fluid line connection 42 whereby fluid can return from the motor to the inlet of the pump. This structure is conventional and the conventional structure further includes a charge pressure circuit including a charge pump 45 which draws fluid from a reservoir 46 which passes through a filter 47. The charge pump 45 functions to provide make-up fluid to the closed circuit between the pump and motor by supply to the low pressure side through either of the charge check valves 48 and 49 which, at their upstream ends, are connected to a fluid line 50 connected to the outlet side of the charge pump and, at their downstream ends are connected to the fluid line connections 41 and 42, respectively. A charge relief valve 51 operates to relieve the charge pressure when it exceeds the setting of the charge relief valve. The reservoir 46 is supplied from fluid within the casing of the motor 16 through a line 52 which extends to the reservoir 46 and has a heat exchanger 53 therein for cooling the fluid, such as oil.

Another conventional part of a hydrostatic transmission is the displacement control which includes a control valve, indicated generally at 55, and which is supplied with charge pressure fluid through the line 50. The displacement control valve 55 is positionable to control the fluid connections of a pair of servo control cylinders 56 and 57 mounted in the pump casing 20 and which, through pivotally connected links 58 and 59 extended to the swash plate 24, control the position of the swash plate.

Displacement control valve 55 has a movable valve member 60 which controls communication of the servo control cylinders with either a charge pressure port or tank ports at the displacement control valve. More particularly, servo control cylinder 56 is connected to a port of the displacement control valve by lines 61 and 62 and the servo control cylinder 57 is connected to a port of the displacement control valve by lines 63 and 64.

The displacement of the swash plate 24 is established by initially setting a position of the displacement control valve member 60 which, as shown, can be under the control of a handle 68 which is pivotally mounted and which, through linkage, is connected to the valve member. In the use of the variable displacement pump as part of the hydromechanical transmission for the purposes described herein, only the servo control cylinder 56 need be used to position the swash plate 24 since only one side of the hydrostatic closed circuit is pressurized throughout the speed range of the working element driven by the transmission and the internal forces within the variable displacement unit always tend to tilt the swash plate toward a clockwise extreme position. As the handle 68 is pivoted from the position shown in a direction to shift the valve member toward the left, as viewed in FIG. 2, charge pressure is delivered through lines 61 and 62 to the servo control cylinder 56, acting to extend the piston within the cylinder and thereby move the swash plate from the maximum displacement position shown towards a reduced displacement position. The linkage interconnecting the handle 68 and the valve member 60 includes a feedback linkage connected to the swash plate whereby the valve member is caused to return to a position where lands of the valve member block the servo control cylinder 56 from both charge pressure and a tank port at the displacement control valve. This feedback linkage includes a link 70 pivotally connected to an end of the valve member and having pivot connections to links 71 and 72 which pivotally connect to the handle 68 and the swash plate, respectively.

With the swash plate 24 positioned as shown in FIG. 2, the pump is at maximum displacement and thereby the motor 16 is operating at maximum speed. Within the planetary gear set 11 there is a maximum subtraction of speed from the input speed derived from the input shaft 10 whereby the drive shaft 12 is rotating at minimum speed and, in fact, could be nonrotating. As the swash plate is caused to move from maximum displacement toward zero displacement position, the speed of the motor 16 is reduced with the resulting increase in speed of the drive shaft 12.

With the drive shaft 12 driving a main rotor in a rotary combine harvester, or driving some other working element which can become overloaded, there is an increase in pressure in the high pressure side of the closed circuit between the pump and motor when overloading occurs. Means for sensing the pressure on the high pressure side comprises a pressure limiter sensing valve 75 which is normally closed by having a valve member spring-urged to a closed position to close a fluid line 76 connected to the fluid outlet 40 of the pump and which has a section 77 extending to the line 61 connected to the servo control cylinder 56. The pressure limiter sensing valve can either be pre-set or remotely selectively set to open at a predetermined value of pressure in the fluid line connection 41 between the pump and motor and, when opened, high pressure fluid is directed to the servo control cylinder 56. This results in moving the swash plate 24 to a reduced displacement position whereby the speed of the motor output shaft 18 reduces and the speed of the drive shaft 12 from the planetary gear set increases. For illustrative purposes, the predetermined value or level of the pressure at which the pressure limiter sensing valve 75 will open can be 5,000 psi. If the increase in speed of the drive shaft 12 is sufficient to discharge the excess material from the working element, the pressure in the closed circuit will ultimately reduce and the hydrostatic transmission will return to the speed of operation set by the displacement control valve 55.

In the unlikely event that the working element is unable to discharge excess material and the working element does jam, then the pressure limiter sensing valve 80, which is set to open at a pressure higher than the pressure limiter sensing valve 75, will open. This valve has an inlet connected to the pump outlet 40 by a line 81 and an outlet connected by a line 82 to a line 83 which connects to the servo control cylinder 57. Each of the pressure limiter sensing valves 75 and 80 are of the type having a valve member urged to a closed position by a spring and with the force of the spring being settable to control the pressure at which the valve will open. The pressure limiter sensing valves can be of a type which can be remotely adjustable. When the pressure limiter sensing valve 80 opens, the swash plate 24 moves to a maximum displacement position, with the result that the drive shaft 12 stops rotation. An optionally usable orifice 85 in the line 76 can be used to insure that pressure limiter sensing valve 80 will be effective to override the operation of the pressure limiter sensing valve 75.

Commonly mounted pressure limiter check valves 90 and 91 have their downstream sides connected to the charge pressure line 50 and their upstream ends connected to the lines 77 and 63, respectively, whereby the pressure in either of the latter lines in excess of the setting of a spring connecting the valve members 90 and 91 and charge pressure acting on the back side of the valve members will cause a valve member to open to discharge fluid to the charge pressure line 50.

If the working element, such as the main rotor of a rotary combine harvester is driven by a hydrostatic transmission, output to the rotor usually via reduction gearing rather than by a hydromechanical transmission. The same control can be used since the main rotor normally operates in one direction only and one side of the main hydrostatic loop is pressurized. In such control in a hydrostatic transmission, the pressure-limiter sensing valve 75 when opened would cause delivery of fluid pressure to the servo control cylinder which would act to move the swash plate to increase the displacement of the pump and thereby increase the speed of the motor 16. The pressure limiter sensing valve 80 would be connected to the servo control cylinder which, when activated, would move the swash plate to a zero displacement position.

INDUSTRIAL APPLICABILITY

With the anti-plug control disclosed herein, pressure in the closed circuit of a hydrostatic transmission can be sensed when a working element becomes overloaded and the hydrostatic transmission adjusted in response to an increase in pressure in the closed circuit of the hydrostatic transmission to increase the speed of the drive of the working element in an effort to clear the overload of material and prevent a jam.

I claim:

1. An anti-plug control in combination with a drive for a driven working element to prevent jamming of the driven working element in response to an overload wherein said drive includes a fluid motor and a variable displacement fluid pump for supplying fluid to the motor comprising, servo means including a servo control cylinder for controlling displacement of the pump, means for sensing the pressure of the fluid delivered by the pump to the motor, means responsive to an increase of said pressure beyond a predetermined value for modifying the displacement of said pump to increase the speed of said drive, and means operable in response to an increase in the fluid pressure a predetermined amount beyond said predetermined value for modifying the displacement of the pump to decrease the speed of the drive.

2. A combination as defined in claim 1 wherein the last-mentioned means is operable to stop the drive.

3. A combination as defined in claim 1 wherein there are a pair of said servo control cylinders and the means operable to increase the speed of the drive includes a fluid line extended between the pump outlet and one of said servo control cylinders and a pressure-responsive valve normally closing said fluid line and openable when said fluid pressure reaches said predetermined value.

4. A combination as defined in claim 3 wherein the means for decreasing the speed of the drive when the fluid pressure goes a predetermined amount beyond said predetermined values comprises, a second fluid line between the pump outlet and the other of said servo cylinders and a second normally closed pressure-responsive valve in said second fluid line set to open at a fluid pressure value higher than said predetermined value.

5. A combination as defined in claim 4 wherein the fluid lines from the pump outlet are interconnected and an orifice in the fluid line to said one servo control cylinder to insure flow to the other servo control cylinder when the second pressure-responsive valve opens.

6. A control in combination with a hydrostatic transmission having a pump and a motor in a closed circuit with the pump having a movable swash plate and a pair of positioning servo control cylinders connected thereto comprising, a pair of fluid lines connected to the pump outlet and connected one to each of said servo control cylinders, a pair of normally closed pressure-responsive valves positioned one in each of said fluid lines for blocking fluid flow to said servo control cylinders, said pressure-responsive valves being openable at different values of pressure in said closed circuit whereby said swash plate is urged in one direction when one valve opens and in an opposite direction when the other valve opens.

7. An anti-plug control in combination with a drive which drives a working element that can be jammed by excessive material comprising, a hydro-mechanical transmission having a hydrostatic transmission including a variable displacement pump and a motor in closed circuit, a servo control valve and a servo control cylinder connected to the servo control valve and a movable swash plate of the pump and operable by pressure to decrease the pump displacement, said control comprising a fluid line connected between the high pressure side of said closed circuit and said servo control cylinder, a normally closed pressure-sensing valve in said fluid line and openable in response to a certain pressure in the high pressure side of the closed circuit to permit fluid pressure from the closed circuit to act on the servo control cylinder and decrease pump displacement, a second servo control cylinder, and means including a second normally closed pressure-sensing valve openable when the pressure in the high pressure side of the closed circuit substantially exceeds said certain pressure to permit fluid pressure from the closed circuit to act on the second servo control cylinder and increse pump displacement.

8. An anti-plug control in combination with a drive for a driven working element, said anti-plug control being operable to prevent jamming of the driven working element in response to an overload, said drive including a fluid motor having an output shaft, gearing connecting said output shaft to said driven working element and a variable displacement fluid pump for supplying fluid to the motor, servo means including a servo control cylinder for controlling displacement of the pump, said anti-plug control comprising means for sensing the pressure of the fluid delivered by the pump to the motor, means responsive to an increase of said pressure beyond a predetermined value for modifying the displacement of said pump to increase the speed of said driven working element, and means operable in response to an increase in the fluid pressure a predetermined amount beyond said predetermined value for modifying the displacement of the pump to decrease the speed of the driven working element.

9. An anti-plug control in combination with a drive which drives a working element,that can be plugged or jammed by excessive material with the drive including a hydrostatic transmission having a variable displacement unit and a fixed displacement unit with a fluid connection therebetween and a hydromechanical transmission having planetary gearing utilizing said hydrostatic transmission, said variable displacement unit being at maximum displacement when the drive is at minimum speed and the displacement of the variable displacement unit being decreased when the fluid pressure exceeds the set value to decrease the speed of the fixed displacement unit and increase the speed of the drive comprising, means operable to change the displacement of the variable displacement unit to increase the speed of the drive including a servo control cylinder, and means responsive to an increase in pressure of the fluid in said fluid connection beyond a set amount for causing operation of said first mentioned means, including a valve which opens to deliver fluid from said fluid connection to said servo control cylinder, and means operable when the fluid pressure substantially exceeds the set amount for increasing the displacement of the variable displacement unit.

* * * * *